(12) United States Patent
Heidjann et al.

(10) Patent No.: US 6,435,966 B1
(45) Date of Patent: Aug. 20, 2002

(54) HARVESTING MACHINE HAVING TRANSVERSELY ROTATING CONVEYING DRUM WITH CONVEYING TINES

(75) Inventors: Franz Heidjann; Martin Dammann, both of Harsewinkel; Dirk Speckamp, Ahlen; Bodo Kühn, Gütersloh; Walter Fögeling, Herzebrock-Clarholz; Andreas Arnold, Werther, all of (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/559,350

(22) Filed: Apr. 27, 2000

(30) Foreign Application Priority Data

May 5, 1999 (DE) .......................................... 199 20 538

(51) Int. Cl.⁷ .......................... A01F 12/44; B07B 1/50; B08B 5/00
(52) U.S. Cl. .......................... 460/97; 460/98; 460/110
(58) Field of Search .......................... 460/97, 119, 108, 460/109, 110, 72, 104, 141, 30, 85, 73, 74, 32, 84, 87, 88, 89, 113, 46, 66, 71, 121, 122; 56/14.6

(56) References Cited

U.S. PATENT DOCUMENTS

| 785,222 | A | * | 3/1905 | Kramer | 460/81 |
|---|---|---|---|---|---|
| 806,995 | A | * | 12/1905 | Robinson | 460/81 |
| 976,306 | A | * | 11/1910 | Sipler | 460/85 |
| 1,017,129 | A | * | 2/1912 | Boe | 460/114 |
| 1,037,248 | A | * | 9/1912 | Heinz | 460/91 |
| 1,116,113 | A | * | 11/1914 | Piper | 460/88 |
| 1,442,526 | A | * | 1/1923 | Hungerford | 460/114 |
| 1,547,476 | A | * | 7/1925 | White | 460/85 |
| 2,778,483 | A | | 1/1957 | Nikkel | |
| 2,851,144 | A | * | 9/1958 | Carroll | 198/518 |
| 3,021,662 | A | | 2/1962 | Yaniuk | |
| 3,620,223 | A | * | 11/1971 | Witzel | 460/88 |
| 3,800,803 | A | * | 4/1974 | Rouse | 460/101 |
| 4,271,956 | A | * | 6/1981 | Hutchinson et al. | 198/613 |
| 4,453,375 | A | | 6/1984 | Field | 56/364 |
| 4,539,801 | A | | 9/1985 | Field | |
| 4,574,815 | A | * | 3/1986 | West et al. | 460/80 |
| 4,998,904 | A | * | 3/1991 | Kersting | 460/114 |
| 5,192,246 | A | * | 3/1993 | Francis et al. | 460/72 |
| 5,413,531 | A | * | 5/1995 | Tanis | 460/72 |
| 6,036,598 | A | * | 5/1998 | Harden et al. | 460/66 |
| 5,813,205 | A | * | 9/1998 | Gosa | 56/364 |
| 6,244,955 | B1 | * | 1/1999 | Bischoff et al. | 460/114 |

FOREIGN PATENT DOCUMENTS

| DE | 12 26 352 | 10/1966 | |
|---|---|---|---|
| DE | 15 82 412 | 6/1970 | |
| DE | 24 26 731 | 12/1975 | |
| DE | 24 55 565 | 5/1976 | |
| DE | 4000909 | * 1/1990 | ........... A01F/12/28 |
| DE | 197 09 396 | 9/1998 | |
| DE | 197 09 400 | 9/1998 | |
| DE | 198 03 336 | 8/1999 | |
| EP | 0 173 225 | 3/1986 | |
| EP | 0 862 848 | 9/1998 | |
| EP | 0 862 849 | 9/1998 | |
| EP | 0 862 850 | 9/1998 | |
| GB | 1188502 | * 4/1970 | ................. 460/114 |
| GB | 1 259 734 | 1/1972 | |
| GB | 2 095 964 | 10/1982 | |

* cited by examiner

*Primary Examiner*—Thomas B. Will
*Assistant Examiner*—Árpád F Kovács
(74) *Attorney, Agent, or Firm*—Crowell & Moring LLP

(57) ABSTRACT

A harvesting machine having a dividing device for dividing granular material from stem- or stalk-like material, and a separating device connected downstream of the dividing device, in which there is a conveying unit for conveying the stream of material from the dividing device to the separating device. In order to satisfactorily discharge the stem- or stalk-like material from the conveying tines of the conveying unit, cleaning elements are provided for cleaning away the material being conveyed over the free ends of the conveying tines.

20 Claims, 4 Drawing Sheets

HARVESTING MACHINE HAVING TRANSVERSELY ROTATING CONVEYING DRUM WITH CONVEYING TINES

FIELD OF THE INVENTION

The invention relates to a harvesting machine, in particular a combine harvester, having a dividing for dividing a granular stream of material from the stream of material of remaining plant parts, a separating device connected downstream of the dividing device, and a revolving conveying unit having conveying tines being provided to convey the stream of the material from the dividing device to the separating device.

BACKGROUND AND SUMMARY OF THE INVENTION

Conventional combine harvesters are generally provided with a threshing unit as a dividing device for dividing the grains from the ears of cereal, and therefore also from the straw, with a separating device being connected downstream thereof. In this separating device, (conventionally designed as shakers), the stream of grain material is divided from the stream of straw material.

Apart from so-called surface shakers, in which a shaking element extends over the entire working width of the separating device, use is also made of so-called tray-type shakers with which the shaking surface has been divided up, so that individual trays are arranged next to one another over the working width in accordance with a flat separating device. The individual shaker trays can execute different shaking movements, under the control of a crankshaft, for example.

In order to conduct the stream of material from the dividing device to the separating device, use is made of various conveying devices. Use is frequently made in this case of so-called conveying drums which operate either in an overshot manner or an undershot manner and conduct the material from the dividing device to the separating device using conveying tines protruding from the circumferential surface of the conveying drum. In many embodiments of a conveying drum of this type, the conveying tines in this case are fixed such that they can move with respect to the conveying drum and eccentrically with respect to the axis of the conveying drum, on a crankshaft, for example. Conveying units of this type are described, for example, in the publications EP 86 28 48, EP 86 28 49 and EP 86 28 50.

Experience has shown that with such controlled conveying tines, there is the not inconsiderable risk of the rotating conveying drum not completely discharging the material, with the result that the straw becomes jammed on the circumferential surface of the drum and is carried along over the entire circumference of the drum. Within a very short period this leads to a layer of straw building up on the circumferential surface of the drum, resulting in the combine harvester stopping. This process is also referred to as winding.

In contrast, the invention has the object of proposing a harvesting machine, in particular a combine harvester, in whose conveying device satisfactory discharging of material takes place in order to supply the separating device.

Taking harvesting machines of the type mentioned in the introduction as the starting point, this object is achieved by the characterizing feature in that at least one cleaning element for cleaning the material away from the free end of the conveying tines is provided.

Advantageous designs and developments of the invention are possible by means of the measures mentioned and described herein.

Accordingly, a harvesting machine according to the invention is distinguished in that at least one cleaning element for cleaning the material being conveyed away from the free ends of the conveying tines is provided.

In the case of conveying drums of the abovementioned type, it turns out that the winding, i.e. in the case of a combine harvester, the buildup of a layer of straw on the conveying unit, is essentially caused by the conveying tines. Above all, the material being conveyed, for example straw, is not completely detached from the free ends of the conveying tines at the right time. An additional cleaning element according to the invention assists the detaching of the material from the conveying tines, so that the winding on of material in the form of stem or stalks can be avoided. A cleaning element of this type can be used not only in conjunction with the abovementioned conveying drums, but it can also be used in the case of other conveying units, for example in the case of reel-shaped conveying units or the like.

However, a cleaning element according to the invention is preferably used on a conveying drum having conveying tines, in particular on a conveying drum having movable, controlled conveying tines. As mentioned above, without a cleaning element in this type of conveying unit the material in the form of stems or stalks frequently becomes jammed between the circumferential surface of the drum and the conveying tines when the tines enter into the circumferential surface of the drum, with the result that the abovementioned problem occurs with increasing frequency. As long as the conveying tines has [sic], however, been cleaned beforehand, this jamming is no longer possible.

In a particularly advantageous embodiment, in conjunction with controlled conveying tines mounted on a conveying drum, the invention comprises mounting the cleaning elements on the conveying drum itself, so that the cleaning element rotates together with the conveying drum. By this means, elaborate structural measures in the region of the conveying drum above the separating device are avoided. The invention can be realized by a comparatively uncomplicated modification of the conveying drum.

A cleaning element of this type preferably includes a cleaning strip which extends over the length of the conveying drum and is provided with recesses for the conveying tines. During operation of the conveying unit, the conveying tines move in these recesses. Whereas the free ends of the conveying tines always have to be guided in the circumferential surface of the conveying drum, so that their movement is controlled, and therefore cannot quite dip into the conveying drum, the conveying tines can pass over the cleaning strip completely, so that the material being conveyed is cleaned off completely and can neither become jammed between the conveying tines and the cleaning element nor between the conveying tines and the circumferential surface of the conveying drum.

In an advantageous development of the invention, in addition to the conveying tines, further conveying elements are mounted on the conveying drum. In the rear region of the conveying drum, the conveying tines act in an upward direction, as a result of which the stem- or stalk-like stream of material is lifted up. By means of additional conveying elements, which may, for example, be mounted rigidly on the circumferential surface of the conveying drum, loosening up of the stream of material as it is being conveyed, and therefore a better action over the entire length of the separating device with a more uniform distribution of the material can be achieved. The efficiency of the separating device can therefore be increased.

An additional conveying element of this type advantageously includes a conveying strip protruding obliquely from the circumferential surface area of the conveying drum. A conveying strip of this type is, because the conveying strip is arranged obliquely and not radially with respect to the cylindrical circumferential surface area, able to convey the lifted-up stream of material away from the conveying drum in a loosened up manner.

The conveying strip is advantageously connected to the cleaning strip. This results in only one further component being necessary in order to attach both the cleaning element and the conveying element to the conveying drum. The manufacturing outlay is reduced as a result.

The conveying strip is preferably connected continuously to the cleaning strip. This results in a type of hood-shaped design of the cleaning element in conjunction with the conveying strip. The conveying strip therefore at the same time prevents material which is to be cleaned off from being able to get into the region between the cleaning strip and the circumferential surface of the drum.

In a preferred development of the invention, the recesses in the cleaning strip are designed as open slots. This especially facilitates the fitting of the cleaning strip which, as a result, does not need to be placed onto the conveying tines and, in addition, enables the conveying tines to have the freedom of movement necessary because of the crank control in the circumferential direction of the circumferential surface area of the conveying drum.

The cleaning element is advantageously fastened, for example riveted, screwed or welded, to the circumferential surface area both via the cleaning strip and via the conveying strip. It is recommended for this to make corresponding bevels with which the cleaning element rests in a planar manner on the circumferential surface area of the conveying drum, and at which the welding can be undertaken.

In a particularly advantageous embodiment of the invention, the cleaning element including the conveying strip and the bevels provided for the fastening are bent from sheet metal. This makes cost-effective manufacturing possible.

In a further advantageous embodiment of the invention, supporting elements are provided under the cleaning element. These supporting elements, which may, for example, be designed such that they protrude from the circumferential surface area of the conveying drum in the region of the oblique conveying strip, support the cleaning element, so that the use of a correspondingly weaker material for the production of the cleaning element is possible. In addition, the cleaning elements may, for example, also be connected to the conveying drum on such supporting elements. Fastening by means of welding, screwing, riveting, etc. is also conceivable here.

In a particular embodiment of the invention, at least two conveying units as described are used for distributing the stream of material to the separating device, as a result of which uniform supplying of material with repeated loosening up remains ensured even in the case of relatively long separating devices.

It has furthermore proven advantageous if the separating device below the conveying unit is adapted to the shape of the conveying unit. In addition to good conveying of the stream of material, this at the same time reproduces a guiding function for the stream of material. By this means, in particular in conjunction with a conveying drum which has the above-described, additional conveying elements, the distribution of material can be further improved. To a certain extent, in interaction with the additional conveying elements a type of throwing-off ramp for the material being conveyed is produced.

This adaptation of the separating device can also be carried out in the case of a so-called tray-type shaker, as mentioned above. In this case, the individual shaker trays moving with a regular shaking movement up and down below the conveying unit, are adapted to the shape of the conveying drum.

The adaptation of the shape of the shaker trays to the shape of the conveying drum advantageously also includes a corresponding design of the lateral housing walls of the individual shaker trays. These walls, which are regularly provided with sawtooth-shaped designs which permit only one stream of material in the conveying direction, are, in the development described, provided with rounded cutouts, so that a shaker tray of this type can be moved comparatively closely up to the corresponding conveying drum.

It is furthermore advantageous if additional, upper conveying means are assigned to the conveying unit according to the invention or to the conveying units according to the invention. These upper, additional conveying means in particular contain the stream of material discharged upward by the conveying unit or the conveying units, and can convert the upward movement of the stream of material in this region into a movement in the direction of the separating device. This can also result in a more uniform distribution of material on the separating device.

Different measures are suitable as the upper conveying means. For example, rods which are arranged next to one another in the manner of a rake and have a crank drive may be provided, which rods are optionally provided with corresponding, additional carrier elements for conveying the impacting stream of material in the direction of the separating device. Examples of suitable carrier elements include tine- or step-shaped designs. Other conceivable embodiments of an upper conveying means of this type comprise, for example, planar arrangements with or without additional conveying elements. Revolving devices, for example in the form of one or more drums or of a belt conveyor with or without corresponding, additional conveying elements are also conceivable at this point.

An exemplary embodiment of the invention is illustrated in the drawings and is explained below in more detail with reference to the figures.

BRIEF DESCRIPTION OF THE DRAWINGS

In detail, in the figures

DETAILED DESCRIPTION OF THE DRAWINGS

Figure 1:
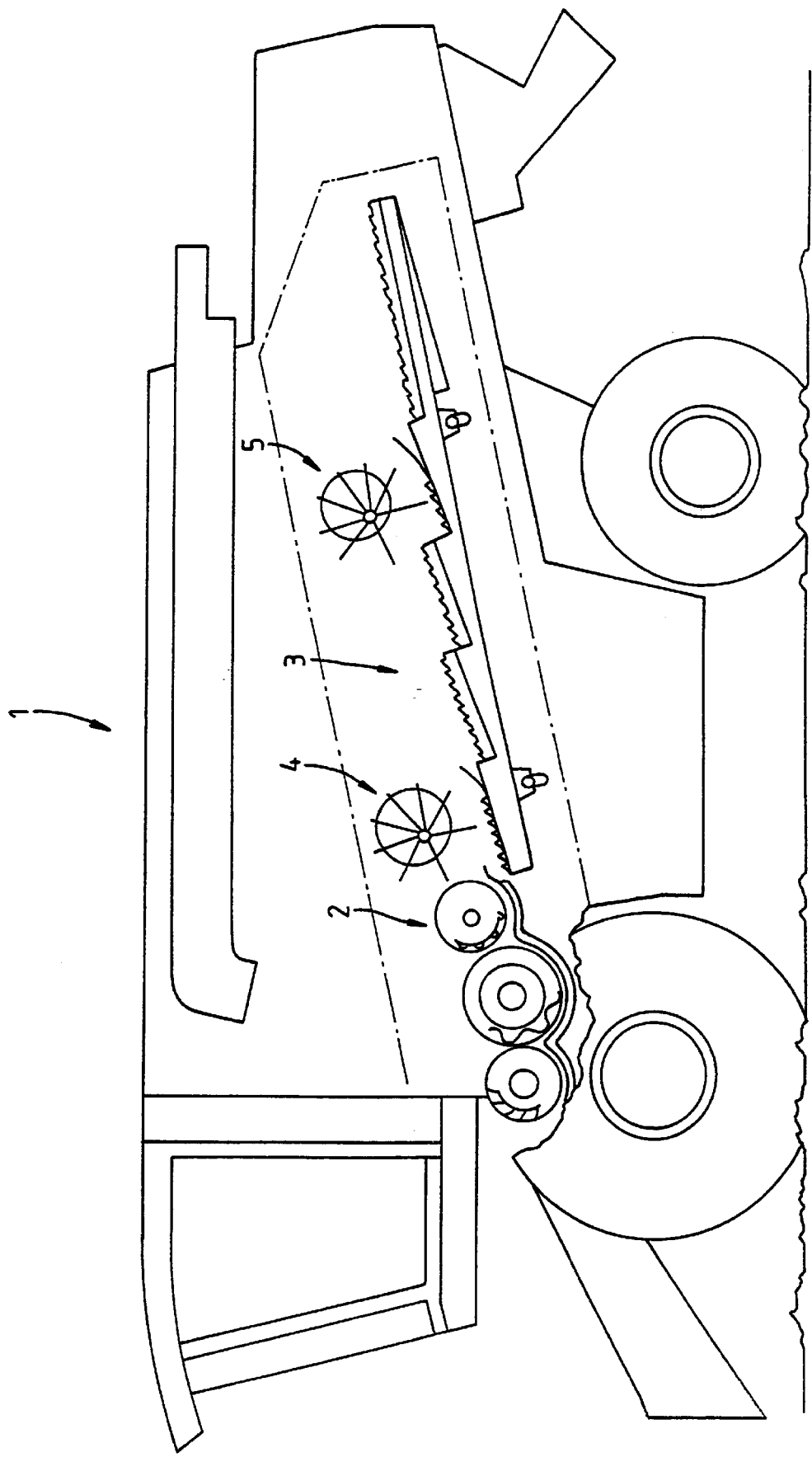
FIG. 1 shows a schematic longitudinal section through a combine harvester.

The combine harvester 1 according to FIG. 1 includes a threshing device 2 for detaching grains of cereal from the ears of cereal, and also a separating device 3 which is connected downstream and is in the form of a tray-type shaker. In order to guide the material to the tray-type shaker and to distribute it on the tray-type shaker 3, two conveying units 4, 5, which convey in an undershot manner, are mounted above the tray-type shaker 3.

Figure 2:
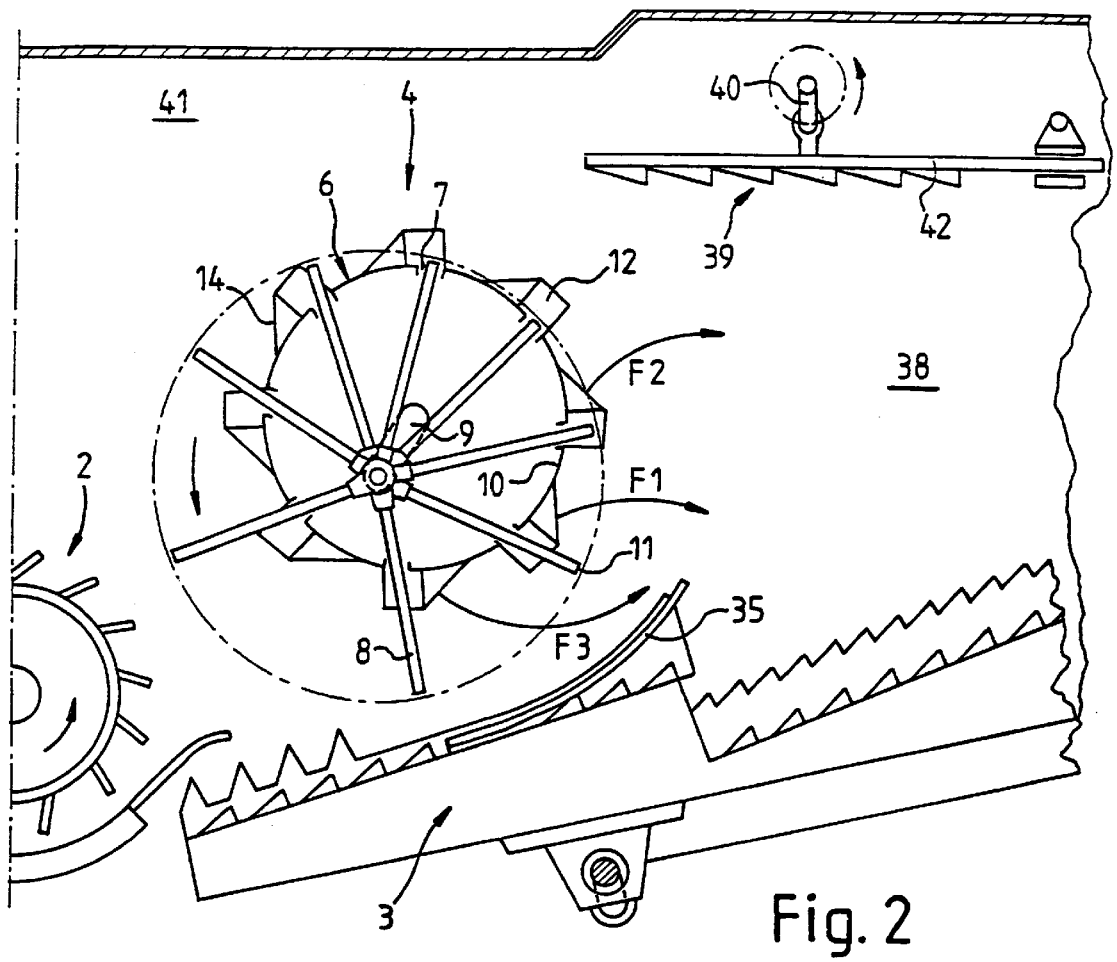
FIG. 2 shows an enlargement of a detail with a conveying unit and a partially illustrated separating device.

The construction of the conveying units 4, 5 becomes clearer with reference to FIG. 2. In FIG. 2, the front conveying unit 4 is illustrated on an enlarged scale in a schematic cross section, it being possible for the rear conveying unit 5 or for other conveying units which are not illustrated in more detail to be of identical construction.

The conveying unit 4 comprises a conveying drum 6 having passages 7 in which conveying tines 8 are movably mounted. The conveying tines 8 are fastened on a crankshaft 9 within the conveying drum 6 eccentrically with regard to the rotational axis of the conveying drum 6. During rotation of the conveying drum and with the crankshaft 9 stationary in the process, this produces a relative movement between the conveying tines 8 and the circumferential surface 10 of the conveying drum 6, during which relative movement the conveying tines 8 emerge periodically out of the circumferential surface 10 and then dip into it again. Corresponding to the eccentricity, the angular orientation of the conveying tines 8 with regard to the circumferential surface 10 changes to a certain extent during this movement.

In order to keep the conveying tines 8 in their guide, it is necessary for the conveying tines 8 not to dip completely into the interior of the conveying drum 6, but rather to remain with their frees end 11 always guided in the circumferential surface 10.

Figure 3:
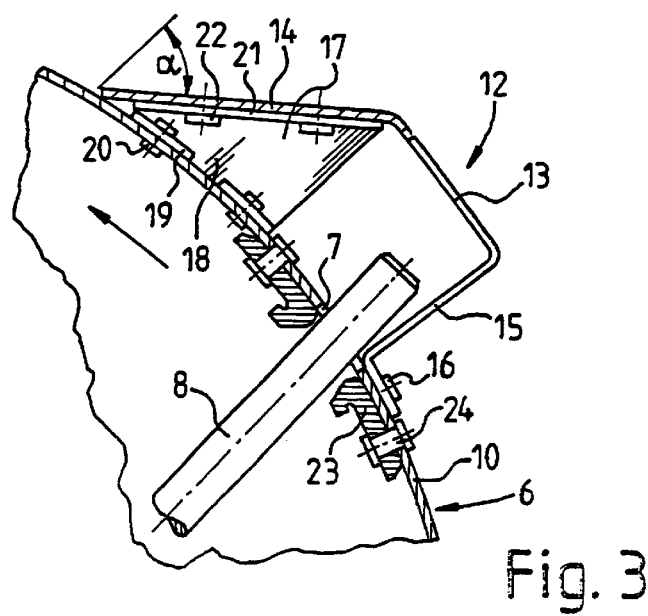
FIG. 3 shows a partial illustration of a cross section through a conveying drum with a cleaning element according to the invention.

It can already be seen by way of indication in FIG. 2 that the cleaning elements 12 are mounted on the conveying drum 6 in the region of the passages 7. These cleaning elements 12 are illustrated in more detail in the detail enlargement according to FIG. 3.

It can be seen that the cleaning element 12 includes a cleaning strip 13 which is arranged transversely to the conveying tines 8 and is connected on the one side to an oblique conveying strip 14 which is inclined at an angle α with respect to the radial alignment. On the side which is opposite the conveying strip 14, the cleaning strip 13 is connected to the circumferential surface 10 of the conveying drum 6 via a double bevel 15. In the present case, the fastening is brought about via a riveted joint 16. However, the fastening could also be brought about by welding or screwing or by other known fastening measures.

Below the conveying strip 14 there is mounted a triangular supporting element 17 on which a narrow side 18 is rounded in order to adapt it to the circumference of the circumferential surface 10. The supporting element 17 is provided with lateral tabs 19 by means of which it is fastened, again via a riveted joint, to the circumferential surface 10 in a manner such that it protrudes vertically from the conveying drum 6. The conveying strip 14 is likewise fastened via a riveted joint 22 to side webs 21.

It can, moreover, be seen that a guide element 23 for the conveying tines 8 is fastened on the inside of the circumferential surface 10 by rivets 24.

Figure 4:
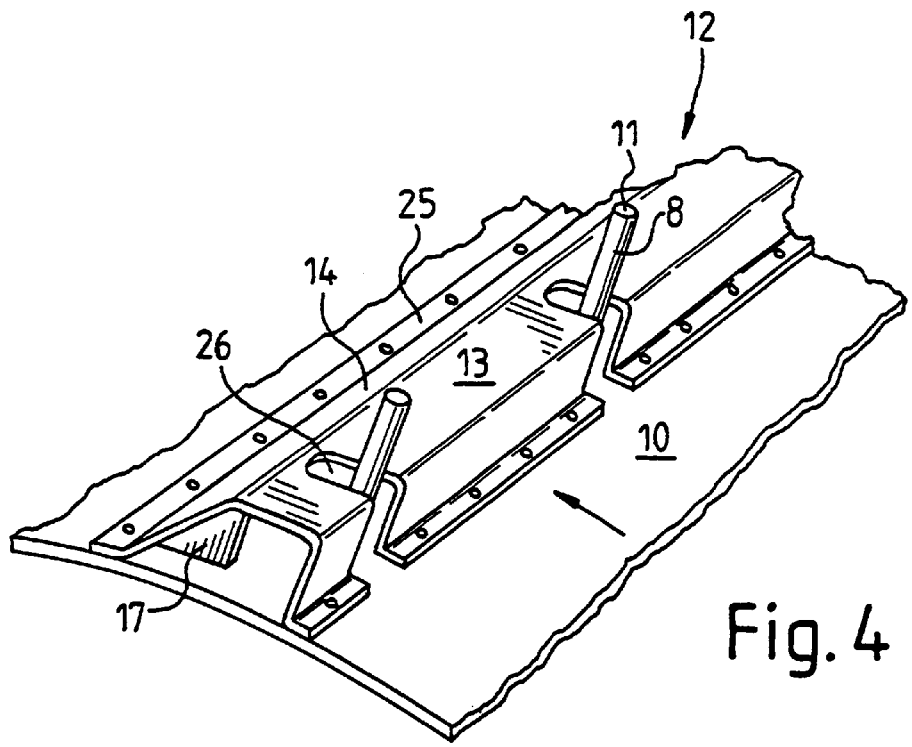
FIG. 4 shows a perspective illustration of part of the exterior view of a conveying drum.

From the perspective illustration according to FIG. 4, which essentially shows the identical design of the cleaning element 12, the action of the cleaning element 12 can be better seen. Unlike the aforementioned exemplary embodiment, in this case the conveying strip 14 is also provided with a bevel 25 in order to fasten it on the circumferential surface 10 of the conveying drum 6. Accordingly, the tabs 19 on the supporting element 17 are omitted. The design of the slots 26 which are open to the rear, with regard to the direction of rotation, and are intended for receiving the conveying tines 8 can in particular also be seen in FIG. 4.

During the rotation of the conveying drum, the tines 8, as mentioned above, constantly move out of the circumferential surface 10 and are pulled back in again. In this connection, they pass through the slots 26 of the cleaning elements 12 in the extended position, and in the pulled-back position are pulled back completely into the space below the cleaning strip 13. In the process, virtually all the material being conveyed which is located on the tines 8 is cleaned away over the free ends 11 of the conveying tines 8. This process can be seen in FIG. 3 and in FIG. 2. In particular, the retracted positions, in which the conveying tines 8 are completely situated below the cleaning strip 13, are illustrated there.

In the process, the oblique conveying strips 14 simultaneously convey the stem- or stalk-like material, for example straw, in the conveying direction to the rear. The action of the conveying strips 14 is indicated by the arrows $F_1$, $F_2$ and $F_3$ in FIG. 2. The arrows $F_1$ and $F_2$ are illustrated bent vertically downward from the conveying strip 13 in order to indicate the influence of gravity on the discharged material being conveyed. The lower arrow $F_3$ is bent upward, since below the conveying drum 6 the tray-type shaker 3 has an upwardly bent shape, resulting in the stream of material being correspondingly guided. These conveying directions which differ depending on the angular position of the conveying drum assist the loosening up of the material being harvested.

Figure 5:
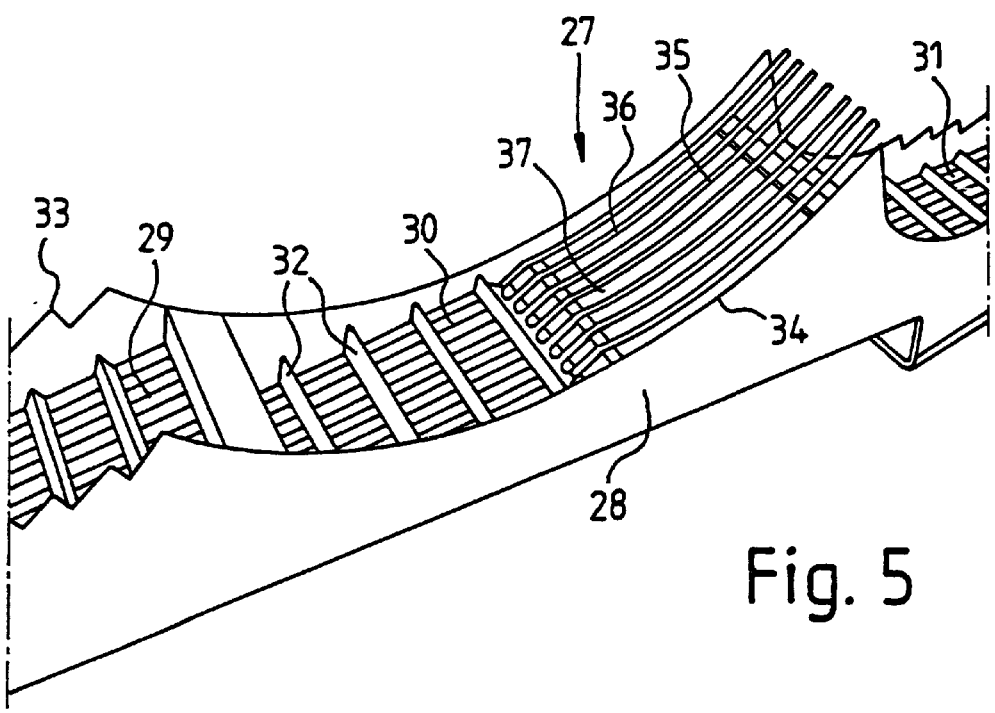
FIG. 5 shows a perspective illustration of a shaker tray for use on a conveying drum according to FIGS. 2 to 4.

As can be seen from FIG. 5, each shaker tray 27 is provided with lateral housing walls 28 and stepped bottoms 29, 30, 31. The bottoms 29, 30, 31 are constructed in the manner of a sieve or rake, with the result that stem- or stalk-like material is transported further on them, while granular material can fall through them. Transverse webs 32 assist the direction of movement of the material being conveyed in the conveying direction during the shaking movements, as does the toothing 33 of the housing walls 28.

The shaker tray 27, which is arranged below the conveying unit 6, is adapted to the shape of the drum. For this purpose, for one thing, the toothing 33 on each housing wall 28 is interrupted, and instead of that a rounded portion 34 is incorporated. Furthermore, the bottom of the shaker tray is modified in that region 35 which is to approach the closest to the conveying drum. Here, there are bars 36 which are adapted to the rounded portion 34, i.e. are bent correspondingly and arranged next to one another in the manner of a rake, so that longitudinal gaps 37 are produced.

This design of the shaker tray 27 makes it possible, for one thing, for the shaker tray to be brought up closely to the conveying drum 6 during the shaking movement. The rake-like arrangement of the bars 36 makes it possible for the tines 8 to be able to dip one piece wide into the longitudinal slots 37, so that complete carrying along of the material which is mounted thereon and is in the form of stems is ensured. At the same time, the material being conveyed is guided upward. The shaker tray designed in such a manner acts to a certain extent as a throwing-off ramp for the material being conveyed. This improves the uniform, loosened-up distribution of material on the following part of the tray-type shaker 2, in particular in interaction with the conveying strips 14.

However, the advantageous actions of the conveying strips 14 and of the special shaker trays adapted to the conveying drum 6 can also be obtained independently of one another. The improved shaker tray 27 can therefore not only be used in combination with cleaning and conveying elements 12, 13, 14 and particularly also not only in conjunction with crank-controlled conveying tines 8, but can also be used in other conveying units, for example even in the case of conveying drums having fixed tines.

It is furthermore proven particularly advantageous to upwardly restrict the conveying space (38) for the material mixture directly behind the conveying unit or units 4, 5 by a conveying means 39, so that the flow of material is additionally influenced positively from above.

Figure 6:
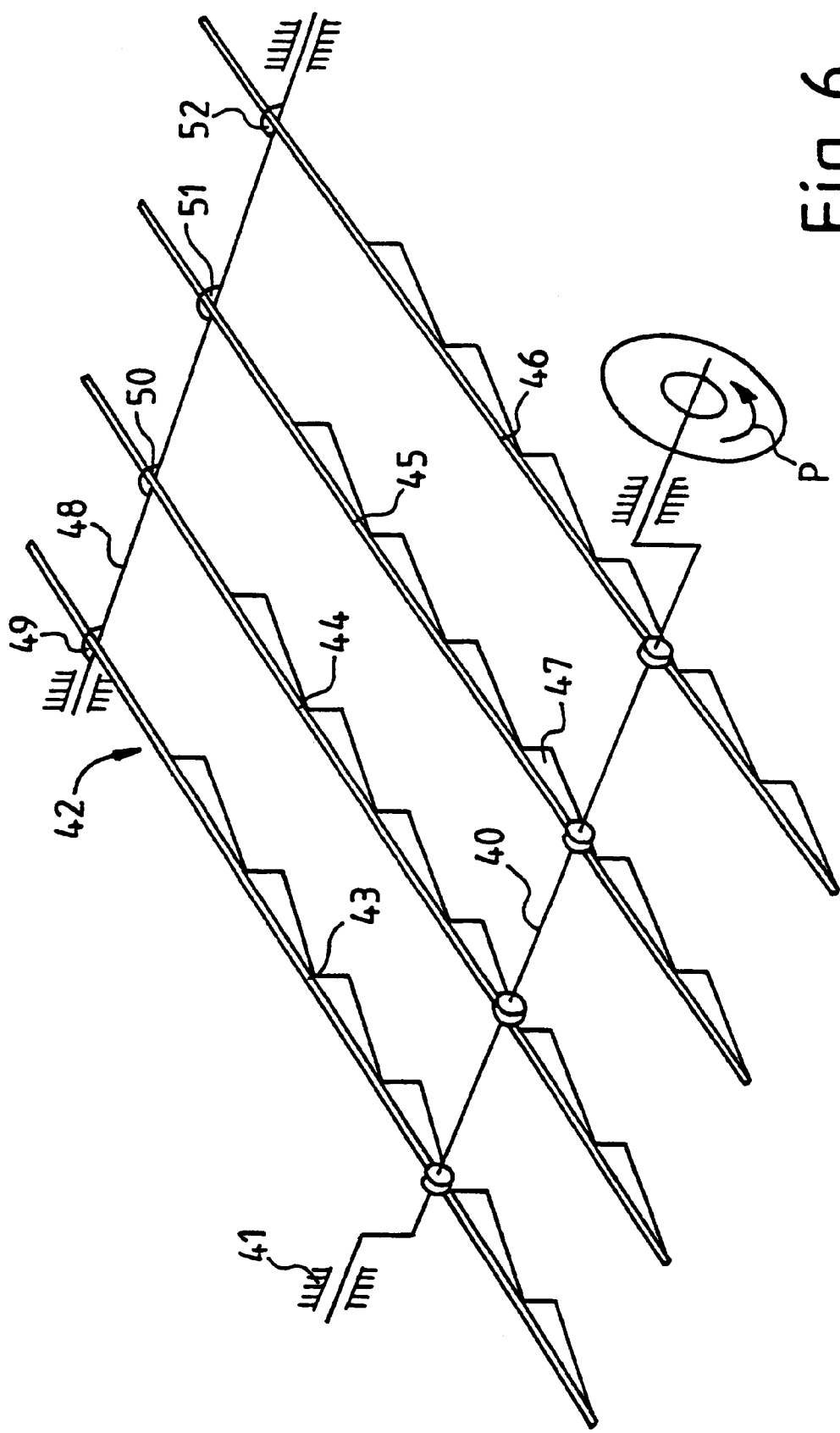
FIG. 6 shows a perspective illustration of an additional, upper conveying means for assignment to a conveying drum according to the invention.

One such, additional, upper conveying means 39 is illustrated in FIGS. 2 and 6. It comprises a crankshaft 40 which is mounted rotatably on the machine housing 41. The crankshaft 40 serves as a drive for a push-rod conveyor 42 having a plurality of push rods 43, 44, 45, 46 arranged next to one another. The push rods 43 to 46 are in each case provided with step-shaped carrier elements 47. The push rods 43 to 46 are mounted pivotably and can be displaced in a guide rod 48 which is likewise fastened to the housing 43 and has guide eyes 49, 50, 51, 52.

The crankshaft 40 is set into rotation, as is illustrated by the arrow P, via a drive, which is not illustrated in more detail. By this means, the push rods 43 to 46 are set into a periodic movement in which an upward and downward movement is combined with a to and fro movement in the longitudinal direction. In this movement, by means of the push rods 43 to 46, in particular in conjunction with the conveying elements 47, the material impacting in the region of the push-rod conveyor 42 is deflected in its upward movement to the rear and conducted further. Another improvement in the distribution of the material on the tray-type shaker 3 can be obtained by an additional, upper conveying means 39 in the conveying space 38. A conveying means 39 of this type can, if required, be assigned to each conveying unit 4, 5.

LIST OF REFERENCE NUMBERS

1. Combine harvester
2. Threshing device
3. Tray-type shaker
4. Conveying unit
5. Conveying unit
6. Conveying drum
7. Passage
8. Conveying tines
9. Crankshaft
10. Circumferential surface
11. Free end
12. Cleaning element
13. Cleaning strip
14. Conveying strip
16. Riveted joint
17. Supporting element
18. Narrow side
19. Tab
20. Riveted joint
21. Side web
22. Riveted joint
23. Guide element
24. Rivet
25. Bevel
26. Slot
27. Shaker tray
28. Housing wall
29. Bottom
30. Bottom
31. Bottom
32. Transverse web
33. Toothing
34. Rounded portion
35. Region
36. Bar
37. Longitudinal gap
38. Conveying space
39. Conveying means
40. Crankshaft
41. Housing
42. Push-rod conveyor
43. Push rod
44. Push rod
45. Push rod
46. Push rod
47. Carrier element
48. Guide rod
49. Guide eye
50. Guide eye
51. Guide eye
52. Guide eye

What is claimed is:

1. A harvesting machine, comprising:
    a dividing device which divides a granular stream of material from a stream of material of remaining plant parts;
    a separating device coupled downstream of the dividing device;
    a revolving conveying drum rotating about an axis transverse to the driving direction of the harvesting machine and having moveable conveying tines provided to convey the stream of material from the dividing device to the separating device;
    at least one cleaning element which cleans the material away from a free end of the conveying tines;
    wherein the cleaning element is mounted on the conveying drum and protrudes radially outward beyond an outermost surface of the conveying drum to clean the material from the free end of the conveying tines before the conveying tines enter a surface of the drum.

2. Harvesting machine according to claim 1, wherein the conveying tines are mounted on the conveying drum.

3. Harvesting machine according to claim 2, wherein the conveying tines are mounted movably on the conveying drum.

4. Harvesting machine according to claim 2, wherein the cleaning element includes a cleaning strip which extends over a length of the conveying drum and has recesses for receiving the conveying tines.

5. Harvesting machine according to claim 1, wherein apart from the conveying tines, at least one additional conveying element is provided.

6. Harvesting machine according to claim 5, wherein the cleaning element includes the additional conveying element.

7. Harvesting machine according to claim 5, wherein the additional conveying element includes a conveying strip protruding obliquely from a circumferential surface area of the conveying drum.

8. Harvesting machine according to claim 7, wherein the conveying strip is connected to the cleaning element.

9. Harvesting machine according to claim 8, wherein the conveying strip is connected continuously to the cleaning element.

10. Harvesting machine according to claim 4, wherein the recesses in the cleaning element are designed as slots which are open on one side.

11. Harvesting machine according to claim 8, wherein the conveying strip and the cleaning strip are bent in the shape of a hood from sheet metal.

12. Harvesting machine according to claim 1, wherein supporting elements are provided under the cleaning element.

13. Harvesting machine according to claim 1, wherein at least two conveying units are distributed over the length of the separating device.

14. Harvesting machine according to claim 2, wherein the separating device is a tray-type shaker having shaker trays, the shaker trays being adapted to the shape of the drum in the region of the conveying drum.

15. Harvesting machine according to claim 14 wherein housing walls of the shaker trays have rounded cutouts adapted to the shape of the conveying drum.

16. Harvesting machine according to claim 14, wherein housing walls of each shaker tray have a sawtooth-shaped design except in a cutout region adapted to the shape of the conveying drum.

17. Harvesting machine according to claim 14, wherein a rake-shaped arrangement of bent bars is provided in a region of each shaker tray which comes nearest to the conveying drum.

18. Harvesting machine according to claim 1, wherein additional, upper conveying means are assigned to the conveying unit.

19. Harvesting machine according to claim 1, wherein said harvesting machine is a combine harvester.

20. A conveying drum for a harvesting machine having a dividing device for dividing a granular stream of material from the stream of material of remaining plant parts and a separating device connected downstream of the dividing device, the conveying drum comprising:

a cylindrical drum operatively arranged to rotate about an axis transverse to a driving direction of the harvesting machine;

moveable conveying tines arranged in the cylindrical drum to convey the stream of material; and at least one cleaning element arranged on the cylindrical drum so as to extend radially outward beyond an outermost surface of the cylindrical drum, said cleaning element cleaning the material away from a free end of the conveying tines before the conveying tines enter a surface of the drum.

* * * * *